United States Patent
Kalavakuru et al.

(10) Patent No.: US 12,003,308 B2
(45) Date of Patent: Jun. 4, 2024

(54) ADAPTIVE CLIENT STEERING IN AN ACCESS POINT USING A MONITORING RADIO

(71) Applicant: Cisco Technology, Inc., San Jose, CA (US)

(72) Inventors: Sivadeep R. Kalavakuru, Akron, OH (US); Ardalan Alizadeh, Milpitas, CA (US); Fred J. Anderson, Lakeville, OH (US); John M. Blosco, Norton, OH (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 17/443,474

(22) Filed: Jul. 27, 2021

(65) Prior Publication Data

US 2023/0029694 A1     Feb. 2, 2023

(51) Int. Cl.
   *H04B 7/08*     (2006.01)
   *H04W 24/02*   (2009.01)

(52) U.S. Cl.
   CPC ......... *H04B 7/0817* (2013.01); *H04B 7/0857* (2013.01); *H04B 7/0865* (2013.01); *H04B 7/0882* (2013.01); *H04W 24/02* (2013.01)

(58) Field of Classification Search
   CPC .. H04B 7/0817; H04B 7/0857; H04B 7/0865; H04B 7/0882; H04W 24/02
   See application file for complete search history.

(56) References Cited

U.S. PATENT DOCUMENTS

| | | | |
|---|---|---|---|
| 2010/0064185 A1* | 3/2010 | Zheng | H04L 1/203 714/704 |
| 2013/0309982 A1* | 11/2013 | Yan | H04B 7/0814 455/79 |
| 2015/0105038 A1* | 4/2015 | Lascari | H04B 1/14 455/230 |
| 2016/0081139 A1 | 3/2016 | Akhavan-Saraf et al. | |

(Continued)

FOREIGN PATENT DOCUMENTS

| | | |
|---|---|---|
| WO | 2020047357 A1 | 3/2020 |
| WO | 2021045633 A1 | 3/2021 |

OTHER PUBLICATIONS

Cisco.com, "Radio Resource Management White Paper," [Accessed Online Jul. 26, 2021] https://www.cisco.com/c/en/us/td/docs/wireless/controller/technotes/8-3/b_RRM_White_Paper.html.

*Primary Examiner* — Junpeng Chen
(74) *Attorney, Agent, or Firm* — Patterson + Sheridan, LLP (57) ABSTRACT

In one embodiment, a system for allocating clients between radios of an access point is disclosed. The system includes a first antenna coupled to a first radio, a second antenna coupled to a second radio, and a monitoring radio coupled to the first antenna and second antenna. The system includes computer-readable instructions that cause the system to receive at the monitoring radio, a first client attribute from each of a plurality of first client devices, and a second client attribute from each of a plurality of second client devices, and provide each aforementioned attribute to an optimization function. The system determines, with the optimization function, that one of the first radio and second radio will optimize performance for at least one device of the plurality of first client devices and second client devices and steer the at least one device accordingly.

17 Claims, 5 Drawing Sheets

(56) References Cited

U.S. PATENT DOCUMENTS

| | | | |
|---|---|---|---|
| 2017/0272108 A1* | 9/2017 | Filipovic | H04B 1/0458 |
| 2019/0103926 A1* | 4/2019 | Chen | H04B 17/0085 |
| 2019/0190584 A1* | 6/2019 | Fang | H04B 7/022 |
| 2019/0394722 A1 | 12/2019 | Gupta et al. | |
| 2020/0267559 A1 | 8/2020 | Mahoney et al. | |
| 2021/0184370 A1* | 6/2021 | Hamabe | H04B 3/52 |

* cited by examiner

ADAPTIVE CLIENT STEERING IN AN ACCESS POINT USING A MONITORING RADIO

TECHNICAL FIELD

Embodiments presented in this disclosure generally relate to steering client devices between radios of an access point. More specifically, embodiments disclosed herein relate to adaptive client steering.

BACKGROUND

Large public venue (LPV) antenna systems are designed for multiple applications and are typically used for high user density applications that benefit from precise beam pattern control and long-range performance. Each access point in an LPV system may include more than one antenna, with each access point being controlled by a wireless controller.

To maintain acceptable performance levels of an access point, one or more clients may be steered between the multiple antennas of the access point. Conventionally, static thresholds of a client attribute are utilized, such as relative signal strength intensity (RSSI), to govern steering between antennas of an access point, and only radios that had an overlapped/bore sighted antenna pattern could steer clients as between each other, relying on a server coupled to each radio for this function.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure relates to a system for allocating clients between radios of an access point (AP) that includes a first antenna coupled to a first radio comprising a first radio attribute, a second antenna coupled to a second radio comprising a second radio attribute, and a monitoring radio coupled to the first antenna and second antenna. The system further includes a memory comprising computer-readable instructions and a processor coupled to the memory and configured to execute the computer-readable instructions. The computer-readable instructions cause the system to receive at the monitoring radio via the first antenna, a first client attribute from each of a plurality of first client devices, receive at the monitoring radio via the second antenna, a second client attribute from each of a plurality of second client devices, and provide each first client attribute, each second client attribute, the first radio attribute, and second radio attribute to an optimization function. The computer-readable instructions further cause the system to determine, with the optimization function, that one of the first radio and second radio will optimize performance for each device of the plurality of first client devices and second client devices and steer, responsive to determining, at least one of the plurality of first client devices to the second radio or at least one of the plurality of second client devices to the first radio.

A further embodiment relates to a method that includes receiving at a monitoring radio coupled to a first antenna, a first client attribute from each of a plurality of first client devices, receiving at the monitoring radio coupled to a second antenna, a second client attribute from each of a plurality of second client devices, and providing each first client attribute, each second client attribute, the first radio attribute, and second radio attribute to an optimization function. The method further includes determining, with the optimization function, that one of the first radio and second radio will optimize performance for at least one device of the plurality of first client devices and the plurality of second client devices, and steering, responsive to determining, at least one device to one of the first radio and second radio.

A further embodiment relates to logic encoded in one or more tangible media and when executed operable to receive at a monitoring radio coupled to a first antenna, a first client attribute from each of a plurality of first client devices, receive at the monitoring radio coupled to a second antenna, a second client attribute from each of a plurality of second client devices, and provide each first client attribute, each second client attribute, the first radio attribute, and second radio attribute to an optimization function. The logic is further operable to determine, with the optimization function, that one of the first radio and second radio will optimize performance for at least one device of the plurality of first client devices and the plurality of second client devices, and steer, responsive to determining, the at least one device to one of the first radio or the second radio.

Conventionally, a base station (BSS) having multiple radios, each with their own antenna, do not measure client device (also called 'client' herein) performance as between radios. As a result, clients are steered between radios based on server defined threshold values for performance indicators such as relative signal strength (RSSI), for a BSS. Once a client falls below the threshold, it may be steered to another radio.

BSS architectures include not only radios for servicing clients, but monitoring radios as well, that are coupled to antenna of radios that do service clients. According to certain embodiments, the monitoring radio is able to detect clients served by all radios of a BSS via coupling to these antennas, and thus having an accurate picture of all clients. Because the monitor radio can 'see' clients in the same way the service radios do, the monitor radio receives data on performance metrics for all clients. As a result, the monitor radio uses the received client performance metrics to steer clients between available radios using real time client data, as opposed to server-based threshold data of conventional approaches.

EXAMPLE EMBODIMENTS

Figure 1:
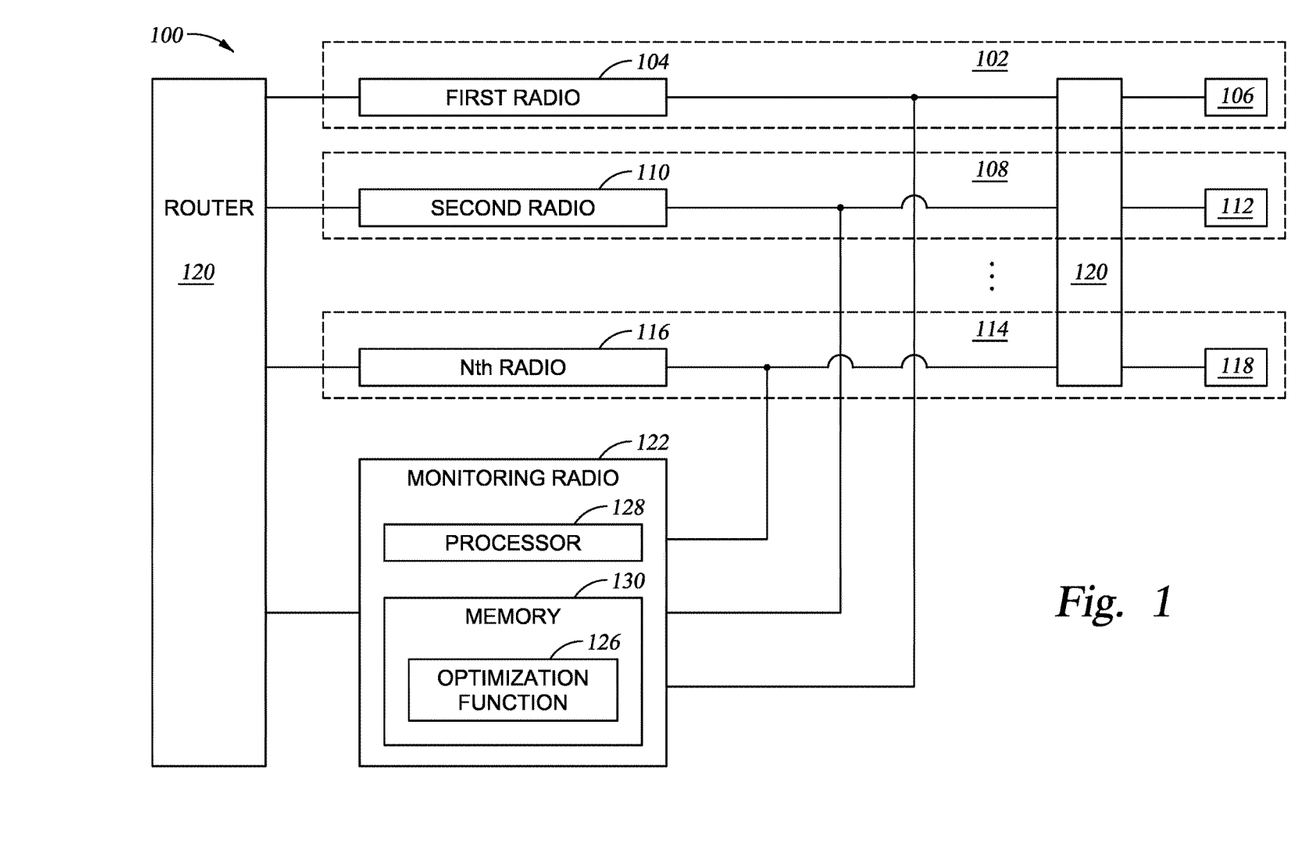
FIG. 1 depicts an access point according to certain embodiments.

FIG. 1 depicts an access point 100 according to disclosed embodiments. Access point 100 may be a large public venue (LPV) system that may be deployed for high user density applications where patter control and long-range performance are beneficial. The access point 100 may comprise one or more cells, each cell comprising a radio and an antenna. During operation, there access point 100 may operate in a mode in which there is no mutual interference between cells. A first cell 102 may include at least a first radio 104 coupled to a first antenna 106, while a second cell 108 includes a second radio 110 coupled to a second antenna 112. According to certain embodiments, the first cell 102 and second cell 108 operate on non-interfering channels on the same or different frequency bands, such as in the 2.4, 5, or 6 GHz bands. As would be understood by one of skill in the art, access point 100 may comprise any number of cells, as is depicted by an nth cell 114, having an Nth radio 116 coupled to an Nth antenna 118.

According to certain embodiments, the first antenna 106, second antenna 112, and Nth antenna 118 may be coupled to their respective radios via a digital analog radio termination (DART), such as DART 120.

Access point 100 further includes a monitoring radio 122 electrically coupled to the first antenna 106, second antenna 112, and Nth antenna 118. By coupling the monitoring radio 122 to the antennas of the cell radios, the monitor radio may monitor clients coupled to each of the first radio 104, second radio 110, through the Nth radio 116, in addition to receiving client attributes related to each coupled client, for provision to an optimization function 126, discussed further below. According to certain embodiments, optimization function 126 may be stored in a memory 130 of the monitoring radio 122, as logic instructions that may be executed on a processor 128. Client attributes in this context may include one or more attributes related to communication between each client and the access point 100, such as relative signal strength indicator (RSSI), client data rate associated with the access point 100, link budget, signal to noise ratio (SNR), and the like. These client attributes may also be referred to herein as metrics and key performance indicators (KPIs).

According to certain embodiments, as the monitoring radio 122 detects clients coupled to each of the first radio 104 and second radio 110, and in some embodiments additional radios through the Nth radio 116, client attributes are collected from each of the cells. Because the monitoring radio 122 receives signals from clients from the same antennas as each of the first through Nth radios, the monitoring radio 122 measurements of client devices are essentially the same as that received by the radios of the cells. Having received client attribute data for all clients serviced by access point 100, in one embodiment the monitoring radio 122 determines an optimal radio assignment for each client and send commands to the cells to steer each client to a radio best suited to service the client. Optimization of radio assignment is discussed below in connection with FIG. 4.

Access point 100 further includes a router 124 coupled to the first radio 104, the second radio 110, through the Nth radio 116, as well as the monitoring radio 122, for sharing data and provision of commands between one or more of these radios.

Figure 2A:
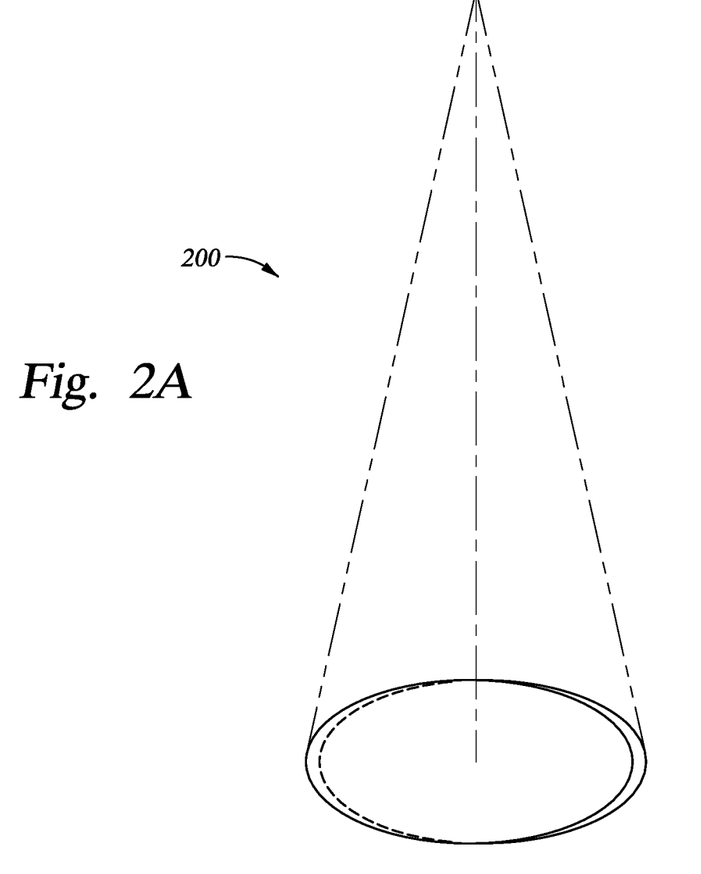
FIGS. 2A & B depict a boresight/overlap antenna pattern, according to certain embodiments.
Figure 2B:
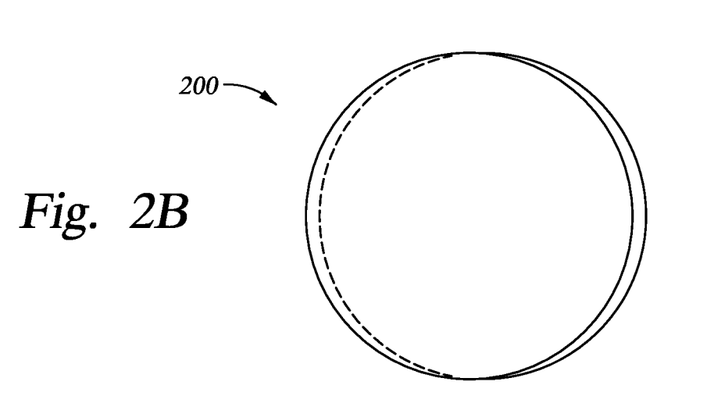
Figure 3A:
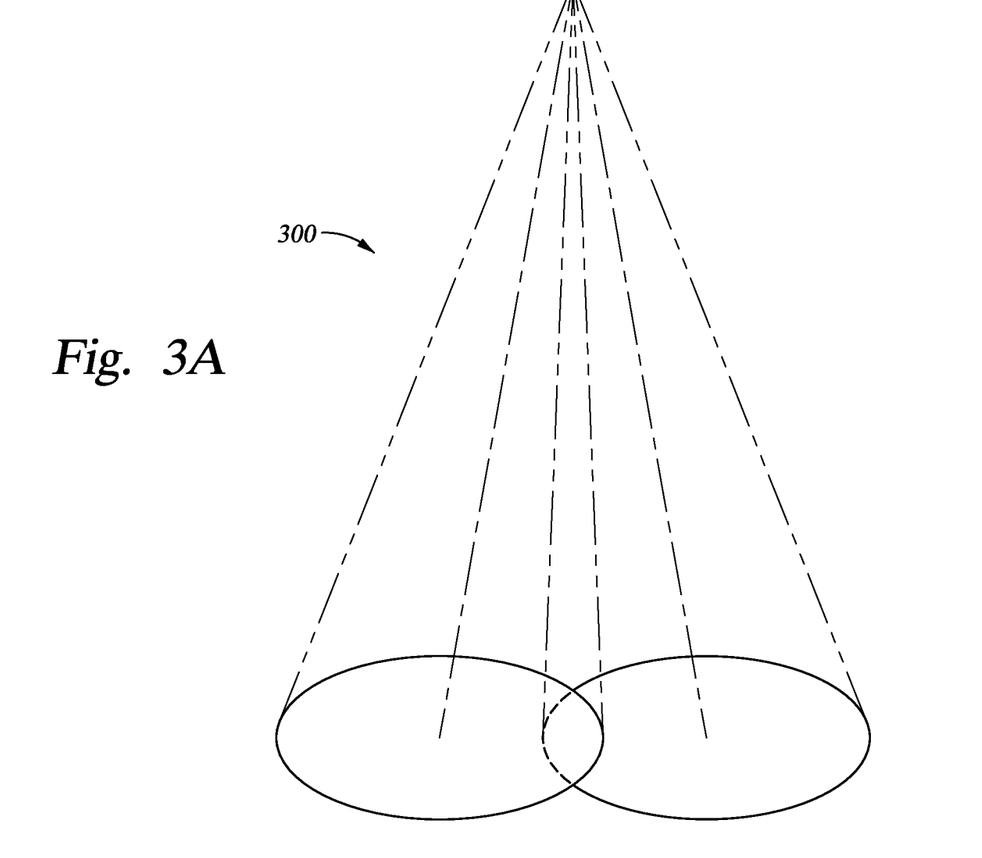
FIGS. 3A & B depict an adjacent antenna pattern, according to certain embodiments.
Figure 3B:
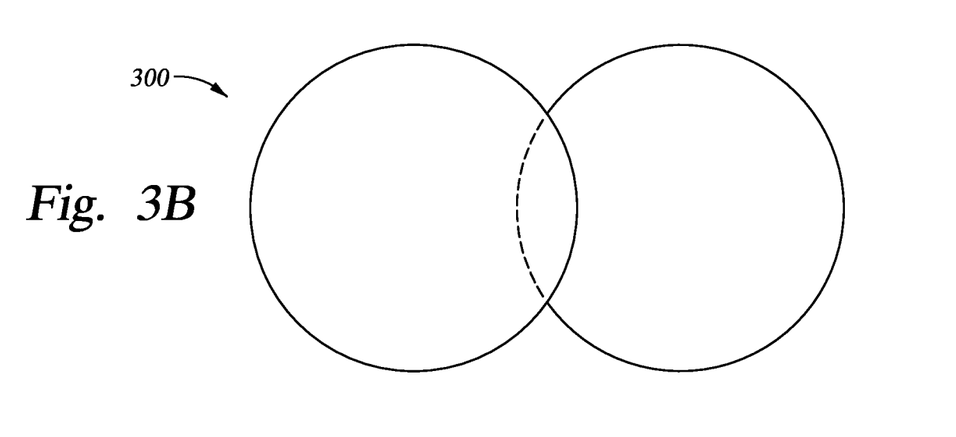

FIGS. 2A & B depict a boresight/overlap antenna pattern 200, according to certain embodiments. For some high client density applications, one or more antennas of FIG. 1 may be patterned in a boresight/overlapping pattern. Alternatively, one or more antennas sight patterns of FIG. 1 may be configured in an adjacent/non-overlapping configuration, as depicted in FIGS. 3A & B. As would be appreciated by one of skill in the art, either or both configurations may be used in certain embodiments, as well as other multi-antenna patterns not shown. In each configuration, each cell of FIG. 1 is non-interfering with adjacent cells; that is, although each cell and the respective components of each are part of the same access point, and concomitant antenna patterns may be even partially overlapping, the radios are configured such that there is little/no mutual interference between the cells.

Figure 4:
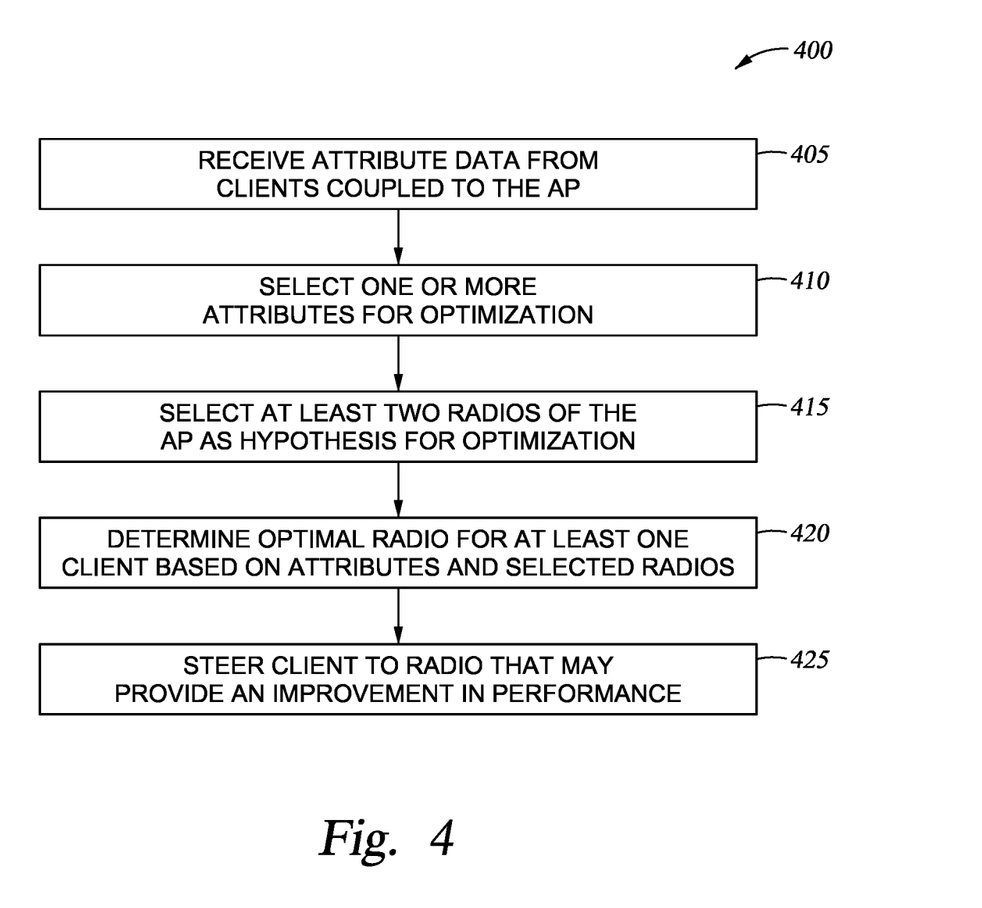
FIG. 4 depicts an optimization method for steering clients between radios of an access point, according to certain embodiments.

FIG. 4 depicts an optimization method 400 for steering clients between radios of an access point, according to certain embodiments. At block 405, a monitoring radio, such as monitoring radio 122, receives attribute data from clients coupled to the access point 100 of FIG. 1. According to certain embodiments, the attributes are received from clients when the client is first detected by a radio of the access point; in these embodiments, new client attribute data is received as new clients join the access point. Attributes, or metrics, received from each client may include and are not limited to relative signal strength indicator (RSSI), client data rate associated with the access point 100, link budget, throughput per radio, collision, and the number of retries, and the like, and the monitoring radio 122 may further collect metrics from the other radios such as the number of associated clients per radio, and the like. The monitoring radio 122 is able to receive attribute data from clients if the antennas of the first radio 104 and second radio 110 are configured in a boresight such as depicted in FIGS. 2A & B, or side by side as depicted in FIGS. 3A & B because the monitoring radio is coupled to antenna inputs for both radios.

At block 410, a user configures the AP to define one or more client attributes collected by the monitoring radio 122 for optimization.

At block 415, the monitoring radio selects at least two radios of the access point 100 as a basis for optimization. As can be seen in FIG. 1, an access point may include any number of radios, such as first radio 104, second radio 110, through Nth radio 116 for providing service to clients. The number of radios chosen for optimization for a given client may be determined by a user and provided in a configuration of the access point 100, and according to certain embodiments may be determined dynamically, such as based on the number of clients currently being serviced by each radio.

At block 420, the monitoring radio determines an optimal radio for at least one client based on client attributes and selected radios by optimization function 126. According to certain embodiments, assuming that the received signal in both hypothesis radios is known, optimization function 126 may be implemented as a likelihood ratio test (LRT) may be employed to make an optimal decision for client steering, taking one or more of the client attributes as inputs to the function described below. Based on the Neyman Pearson (NP) theorem, the probability of a radio improving performance for a client, by the following test:

$$L(k) = \frac{f(k|H_1)}{f(k|H_0)} \overset{H_0}{\underset{H_1}{\gtrless}} \gamma$$

where k is the vector that consists of received client attributes (or metrics), and gamma (γ) is the design threshold which according to certain embodiments may be set to 1, $H_0$ is a first hypothesis being a first radio such as the first radio 104 chosen for purposes of optimization, and $H_1$ is a second hypothesis, being a second radio such as second radio 110 chosen for purposes of optimization against the first radio. In this embodiment, LRT selects the radio for each client that provides a higher probability for performance improvement. As would be appreciated by one of skill in the art, examples according to this embodiment may be suitable only when considering client attributes for which the random variable's distributions or probability density function (PDF) are available, needing only to measure statistical information such as means and variance. Although in some embodiments, one or two of the received client attributes are used in the above equation, according to certain embodiments, up to all client attributes may be used as a vector. For values of the output greater than 1, the first radio would be considered optimal, while values less than one would indicate that the second radio is more probable of being optimal.

In certain embodiments, instead of using an LRT test, the optimization function 126 may be a weighted sum comparison of attributes from a client associated with a radio may be compared to a weighted sum of that client's attributes applied to a different radio. In this context, the weighted sum could be calculated from $$R_x = w1*f1(v1) + w2*f2(v2) + \ldots + w_N*fN(v_N)$$

where the values for $v_i$'s are the measured client attributes, $f(v_n)$ is a look-up table with normalized values, and $w_i$'s are the weights.

At block 425, the client is steered by the monitor radio 122, based on the result of determining the optimal radio for at least one client, the to the radio that was indicated as more probable as having better performance for that client based on the optimization function 126.

Figure 5:
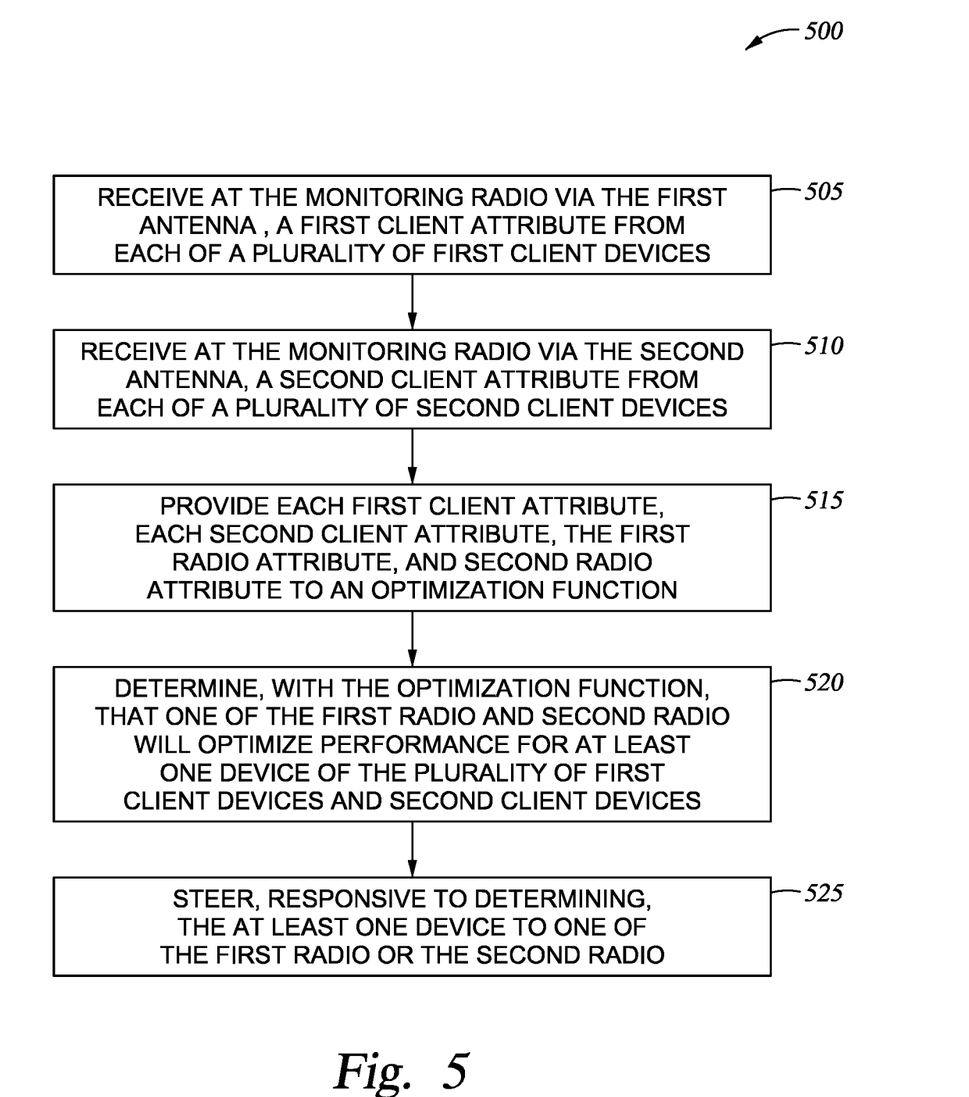
FIG. 5 depicts a method for adaptive client steering, according to certain embodiments.

FIG. 5 depicts a method 500 for adaptive client steering, according to certain embodiments.

At block 505, the monitoring radio 122 coupled to the first antenna 106 receives a first client attribute from each of a plurality of first client devices.

At block 510, the monitoring radio 122 is coupled to the second antenna 112 to receive a second client attribute from each of a plurality of second client devices.

At block 515, the monitor radio 122 providing each first client attribute, each second client attribute, the first radio attribute, and the second radio attribute to optimization function 126. According to certain embodiments, the first client attribute and second client attribute comprise at least one of received signal strength (RSSI), client data rate, or link budget, and the first radio attribute and second radio attribute comprise at least one of one of radio throughput, collision or retry, or number of associated clients According to certain embodiments, the optimization function 126 comprises one of a binary hypothesis test and a weighted sum function.

At block 520, the optimization function 126 determines that one of the first radio and second radio will optimize performance for at least one device of the plurality of first client devices and the plurality of second client devices.

At block 525, the monitor radio 122 steers, responsive to the optimization function 126 determining, at least one device to one of the first radio and second radio. According to certain embodiments, the monitor radio 122 steering at least one of the plurality of first client devices comprises one of probe suppression or deauthorization of a client device of one of the first plurality of client devices and second plurality of client devices.

According to certain embodiments, method 500 a beam of the first antenna 106 may be configured to overlap with a beam of the second antenna 112, and in some embodiments, may include configuring a beam of the first antenna 106 to be adjacent to and non-overlapping with a beam of the second antenna 112.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system for allocating clients between radios of an access point (AP) comprising:
   a first antenna coupled to a first radio comprising a first radio attribute;
   a second antenna coupled to a second radio comprising a second radio attribute;
   a monitoring radio coupled to the first antenna and second antenna,
      wherein the monitoring radio is configured to receive radio signals and is separate from the first radio and the second radio,
      wherein the monitoring radio monitors client attributes for one or more clients coupled to the first radio, using the first antenna and without using the first radio, and
      wherein the monitoring radio monitors client attributes for one or more clients coupled to the second radio, using the second antenna and without using the second radio;
   a processor; and
   memory comprising a program configured to perform an operation when executed by the processor, the operation comprises:
      receiving at the monitoring radio via the first antenna without using the first radio, a first client performance metric from a first client device, the first client performance metric comprising at least one of a received signal strength indicator (RSSI), client data rate, or link budget;
      receiving at the monitoring radio via the second antenna without using the second radio, a second client performance metric from a second client device, the second client performance metric comprising at least one of RSSI, client data rate, or link budget;
      determining, based on the first client performance metric received at the monitoring radio via the first antenna without using the first radio, a first calculation of performance metrics assuming the first client device is coupled to the first radio;
      determining, based on the second client performance metric received at the monitoring radio via the second antenna without using the second radio, a second calculation of performance metrics assuming the first client device is coupled to the second radio;
      determining that the first radio will improve performance for the first client device by comparing the first calculation of performance metrics with the second calculation of performance metrics; and
      steering, based on the determining, the first client device to the first radio.

2. The system of claim 1, wherein the determining that the first radio will improve performance for the first client is further based on the first radio attribute and second radio attribute, each comprising at least one of one of radio throughput, collision or retry, or number of associated clients.

3. The system of claim 1, wherein the first calculation of performance metrics and second calculation of performance metrics each comprises one of a binary hypothesis test and a weighted sum function.

4. The system of claim 3, wherein the first client device is steered to the first radio based on one of probe suppression or deauthorization of a client device.

5. The system of claim 3, wherein a beam of the first antenna is overlapped with a beam of the second antenna.

6. The system of claim 3, wherein a beam of the first antenna is adjacent to and non-overlapping with a beam of the second antenna.

7. A method comprising:
   receiving at a monitoring radio via a first antenna coupled to a first radio comprising a first radio attribute, a first client performance metric from a first client device, the first client performance metric comprising at least one of a received signal strength indicator (RSSI), client data rate, or link budget;
   receiving at the monitoring radio via a second antenna coupled to a second radio comprising a second radio attribute, a second client performance metric from a second client device the second client performance metric comprising at least one of RSSI, client data rate, or link budget, wherein the monitoring radio is configured to receive radio signals and is separate from the first radio and the second radio, wherein the monitoring radio monitors client attributes for one or more clients coupled to the first radio, using the first antenna and without using the first radio, including receiving the first client performance metric via the first antenna without using the first radio, and wherein the monitoring radio monitors client attributes for one or more clients coupled to the second radio, using the second antenna and without using the second radio, including receiving the second client performance metric via the second antenna without using the second radio;

determining, based on the first client performance metric received at the monitoring radio via the first antenna without using the first radio, a first calculation of performance metrics assuming the first client device is coupled to the first radio;

determining, based on the second client performance metric received at the monitoring radio via the second antenna without using the second radio, a second calculation of performance metrics assuming the first client device is coupled to the second radio;

determining that the first radio will improve performance for the first client device by comparing the first calculation of performance metrics with the second calculation of performance metrics; and steering, based on the determining, the first device to the first radio.

8. The method of claim 7, wherein the determining that the first radio will improve performance for the first client is further based on first radio attribute and second radio attribute, each comprising at least one of one of radio throughput, collision or retry, or number of associated clients.

9. The method of claim 8, wherein the first calculation of performance metrics and second calculation of performance metrics each comprises one of a binary hypothesis test and a weighted sum function.

10. The method of claim 9, wherein steering the first client device comprises one of probe suppression or deauthorization of a client device.

11. The method of claim 9, further comprising configuring a beam of the first antenna to overlap with a beam of the second antenna.

12. The method of claim 9, further comprising configuring a beam of the first antenna to be adjacent to and non-overlapping with a beam of the second antenna.

13. Logic encoded in one or more non-transitory tangible media for execution and when executed operable to:

receive at a monitoring radio via a first antenna coupled to a first radio comprising a first radio attribute, a first client performance metric from a first client device, the first client performance metric comprising at least one of a received signal strength indicator (RSSI), client data rate, or link budget;

receive at the monitoring radio via a second antenna coupled to a second radio comprising a second radio attribute, a second client performance metric from a second client device the second client performance metric comprising at least one of RSSI, client data rate, or link budget, wherein the monitoring radio is configured to receive radio signals and is separate from the first radio and the second radio, wherein the monitoring radio monitors client attributes for one or more clients coupled to the first radio, using the first antenna and without using the first radio, including receiving the first client performance metric via the first antenna without using the first radio, and wherein the monitoring radio monitors client attributes for one or more clients coupled to the second radio, using the second antenna and without using the second radio, including receiving the second client performance metric via the second antenna without using the second radio;

determine, based on the first client performance metric received at the monitoring radio via the first antenna without using the first radio, a first calculation of performance metrics assuming the first client device is coupled to the first radio;

determine, based on the second client performance metric received at the monitoring radio via the second antenna without using the second radio, a second calculation of attributes performance metrics assuming the first client device is coupled to the second radio;

determine that the first radio will improve performance for the first client device by comparing the first calculation of performance metrics with the second calculation of performance metrics; and steer, based on the determining, the first client device to the first radio.

14. The logic of claim 13, wherein the determining that the first radio will improve performance for the first client is further based on first radio attribute and second radio attribute, each comprising at least one of one of radio throughput, collision or retry, or number of associated clients.

15. The logic of claim 13, wherein the first calculation of performance metrics and second calculation of performance metrics each comprises one of a binary hypothesis test and a weighted sum function.

16. The logic of claim 15, wherein the first client device is steered to the first radio based on one of probe suppression or deauthorization of a client device.

17. The logic of claim 15, further comprising computer-readable instructions operable to configure a beam of the first antenna to be one of overlapping with or adjacent to a beam of the second antenna.

* * * * *

UNITED STATES PATENT AND TRADEMARK OFFICE
CERTIFICATE OF CORRECTION

PATENT NO. : 12,003,308 B2
APPLICATION NO. : 17/443474
DATED : June 4, 2024
INVENTOR(S) : Sivadeep R. Kalavakuru et al.

It is certified that error appears in the above-identified patent and that said Letters Patent is hereby corrected as shown below:

In the Specification

In Column 5, Line 48, delete "one of one of" and insert -- one of --.

In the Claims

In Column 8, Line 40, in Claim 2, delete "one of one of" and insert -- one of --.

In Column 8, Line 65, in Claim 7, delete "device" and insert -- device, --.

In Column 9, Line 35, in Claim 8, delete "one of one of" and insert -- one of --.

In Column 9, Line 38, in Claim 9, delete "claim 8," and insert -- claim 7, --.

In Column 10, Line 4, in Claim 13, delete "device" and insert -- device, --.

In Column 10, Line 43, in Claim 14, delete "one of one of" and insert -- one of --.

Signed and Sealed this
Fifth Day of November, 2024

Katherine Kelly Vidal
*Director of the United States Patent and Trademark Office*